United States Patent
Ideguchi et al.

(10) Patent No.: US 11,661,669 B2
(45) Date of Patent: May 30, 2023

(54) SUBSTRATE PROCESSING SYSTEM, CONTROLLER AND METHOD USING TEST OPERATION WITHOUT SUBSTRATE

(71) Applicant: EBARA CORPORATION, Tokyo (JP)

(72) Inventors: Kazuma Ideguchi, Tokyo (JP); Shugo Midorikawa, Tokyo (JP); Yosuke Nagasawa, Tokyo (JP); Tensei Sato, Tokyo (JP); Hideki Wakabayashi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 133 days.

(21) Appl. No.: 17/375,239

(22) Filed: Jul. 14, 2021

(65) Prior Publication Data
US 2022/0033989 A1  Feb. 3, 2022

(30) Foreign Application Priority Data
Aug. 3, 2020 (JP) .............................. JP2020-131408

(51) Int. Cl.
*G05B 23/02* (2006.01)
*C25D 17/06* (2006.01)
*C25D 5/02* (2006.01)

(52) U.S. Cl.
CPC ............. *C25D 17/06* (2013.01); *C25D 5/022* (2013.01); *G05B 23/0283* (2013.01)

(58) Field of Classification Search
None
See application file for complete search history.

(56) References Cited

U.S. PATENT DOCUMENTS

| 6,092,980 A * | 7/2000 | Kumasaka ........ H01L 21/67276 |
| | | 414/217 |
| 6,274,058 B1 * | 8/2001 | Rajagopalan ........... C23C 16/52 |
| | | 216/69 |
| 2014/0109833 A1 * | 4/2014 | Ito ..................... H01L 21/67276 |
| | | 118/730 |

(Continued)

FOREIGN PATENT DOCUMENTS

| JP | 2016-098399 A | 5/2016 |
| JP | 2018-009215 A | 1/2018 |

OTHER PUBLICATIONS

English translation of Sugimoto et al. Japanese Patent Document JPH08145300A (published 1996).*

*Primary Examiner* — Bernard G Lindsay
(74) *Attorney, Agent, or Firm* — BakerHostetler

(57) ABSTRACT

Provided is a technique configured to cause a first actual operation to be started in a short time when the actual operation of a substrate processing component group is performed a plurality of times. A substrate processing system 10 includes a substrate processing apparatus 11 having a substrate processing component group 20 and a controller 40. The substrate processing component group 20 is configured to perform a test operation and an actual operation. The substrate processing component group 20 has a first substrate processing component and a second substrate processing component. When the actual operation is performed a plurality of times, the controller 40 causes the first substrate processing component to perform the test operation and causes the actual operation of the first substrate processing component to be started after completion of the test operation of the first substrate processing component.

8 Claims, 6 Drawing Sheets

(56) References Cited

U.S. PATENT DOCUMENTS

| | | | |
|---|---|---|---|
| 2015/0099373 A1* | 4/2015 | Sano | H01L 21/022 438/763 |
| 2015/0179426 A1* | 6/2015 | Furuta | H01L 21/02274 438/791 |
| 2016/0145760 A1 | 5/2016 | Fujikata et al. | |
| 2018/0016698 A1 | 1/2018 | Miyamoto | |
| 2018/0350642 A1* | 12/2018 | Mizuguchi | H01J 37/32935 |
| 2020/0095677 A1* | 3/2020 | Tsiang | C23C 16/24 |
| 2021/0011455 A1* | 1/2021 | Jalluri | B25J 9/1674 |

* cited by examiner

SUBSTRATE PROCESSING SYSTEM, CONTROLLER AND METHOD USING TEST OPERATION WITHOUT SUBSTRATE

TECHNICAL FIELD

The present invention relates to a substrate processing system, a controller for the substrate processing system, and an operation method of the substrate processing system. This application claims priority from Japanese Patent Application No. 2020-131408 filed on Aug. 3, 2020. The entire disclosure including the descriptions, the claims, the drawings, and the abstracts in Japanese Patent Application No. 2020-131408 is herein incorporated by reference.

BACKGROUND ART

Conventionally, there is known a substrate processing system including a substrate processing apparatus capable of performing some kind of processing (referred to as a substrate processing) on a substrate. As one example of a substrate processing apparatus of the substrate processing system, for example, PLT 1 and PLT 2 disclose a substrate processing apparatus capable of performing a plating processing on a substrate. The substrate processing apparatus includes a substrate processing component group constituted of a plurality of devices (such as transfer devices and plating devices) used for the substrate processing and a controller controlling the substrate processing component group.

CITATION LIST

Patent Literature

PTL 1: Japanese Unexamined Patent Application Publication No. 2018-9215
PTL 2: Japanese Unexamined Patent Application Publication No. 2016-98399

SUMMARY OF INVENTION

Technical Problem

Now, in a conventional substrate processing system, prior to an "actual operation (an operation where the substrate processing is performed using a substrate)" of a substrate processing component group, a "test operation (an operation where a predetermined operation is performed without using a substrate) is performed in some cases. Then, in the substrate processing system, when the actual operation of the substrate processing component group is performed a plurality of times, the first actual operation is sometimes started after completing the test operation for all the devices included in the substrate processing component group. However, in this case, it may take long hours before the first actual operation of the substrate processing component group is started.

The present invention has been made in view of the above. One object of the present invention is to provide a technique that can cause the first actual operation to be started in a short time when the actual operation of a substrate processing component group is performed a plurality of times.

Solution to Problem (Aspect 1)
To achieve the above object, one aspect of the present invention is a substrate processing system that includes a substrate processing apparatus. The substrate processing apparatus includes a substrate processing component group constituted of a plurality of devices to be used in a substrate processing and a controller configured to control the substrate processing component group. The substrate processing component group is configured to perform a test operation performing a predetermined operation without using a substrate and an actual operation performing the substrate processing using the substrate. When the actual operation is performed a plurality of times, the substrate processing component group includes a first substrate processing component constituted of a plurality of devices to be used in a first time of the actual operation and a second substrate processing component constituted of a plurality of devices to be unused in the first time of the actual operation and used in a second and succeeding times of the actual operations. When the actual operation is performed a plurality of times, the controller causes the first substrate processing component to perform the test operation and causes the actual operation of the first substrate processing component to be started after completion of the test operation of the first substrate processing component.

According to this aspect, when the actual operation of the substrate processing component group is performed a plurality of times, the actual operation of the first substrate processing component is started after the completion of the test operation of the first substrate processing component of the substrate processing component group. Thus, the first actual operation can be started in a short time compared with, for example, a case where the first actual operation of the substrate processing component group is started after the completion of the test operation of all the devices of the substrate processing component group.

(Aspect 2)
In the substrate processing system according to Aspect 1, during execution of the actual operation of the first substrate processing component or during execution of the test operation of the first substrate processing component, the controller may cause the test operation of the second substrate processing component to be started and may cause the actual operation of the second substrate processing component to be started after completion of the test operation of the second substrate processing component. With this aspect, the test operation of the second substrate processing component can be promptly started compared with, for example, a case where the test operation of the second substrate processing component is started after the completion of the actual operation of the first substrate processing component.

(Aspect 3)
In the substrate processing system according any one of Aspect 1 or 2, at least in the first time of the actual operation, the two substrates may be set as one set, and the actual operation may be performed using the one set of substrates. With this aspect, the reduced down time of the substrate processing apparatus can be achieved, resulting in improvement of a substrate processing capacity per unit time of the substrate processing apparatus compared with, for example, a case where the actual operation is performed using only one substrate in the first time of the actual operation.

(Aspect 4)
In the substrate processing system according any one of Aspect 1 to 3, further may include a failure detection device configured to detect a failure of the substrate processing component group based on an operating state of the substrate processing component group, during execution of the test operation of the substrate processing component group. With this aspect, the failure of the substrate processing component group can be detected during the execution of the test operation of the substrate processing component group.

(Aspect 5)

In the substrate processing system according to claim 4, when having detected a failure of the substrate processing component group, the failure detection device may determine whether a failure level as an index indicating a degree of a failure of the substrate processing component group is a low level or a high level where a degree of a failure is higher than the low level and may notify the determination result. With this aspect, the user received the notification can easily grasp whether the failure level of the substrate processing component group is the low level or the high level.

(Aspect 6)

In the substrate processing system according to claim 5, in a case where the failure level is the high level, when an alternative device configured to perform a processing identical to a processing performed by a device to be determined as the high level in the failure level exists in a plurality of devices constituting the substrate processing component group, the controller may use the alternative device instead of a device to be determined as the high level in the failure level in the test operation and the actual operation. With this aspect, use of the alternative device can continue the test operation and the actual operation of the substrate processing component group. In addition, this ensures the reduced occurrence of the damage to the substrate and the reduced occurrence of the quality of the substrate process deviated from the allowable range, due to the actual operation using the device with the high level in the failure level.

(Aspect 7)

To achieve the above object, one aspect of the present invention is a controller for a substrate processing system. The substrate processing system includes a substrate processing component group constituted of a plurality of devices to be used in a substrate processing. The substrate processing component group is configured to perform a test operation performing a predetermined operation without using a substrate and an actual operation performing the substrate processing using the substrate. When the actual operation is performed a plurality of times, the substrate processing component group has a first substrate processing component constituted of a plurality of devices to be used in a first time of the actual operation and a second substrate processing component constituted of a plurality of devices to be unused in the first time of the actual operation and used in a second and succeeding times of the actual operations. When the actual operation is performed a plurality of times, the controller causes the first substrate processing component to perform the test operation and causes the actual operation of the first substrate processing component to be started after completion of the test operation of the first substrate processing component. With this aspect, when the actual operation of the substrate processing component group is performed a plurality of times, the first actual operation can be started in a short time.

(Aspect 8)

To achieve the above object, one aspect of the present invention is an operation method of a substrate processing system. The substrate processing system includes a substrate processing component group constituted of a plurality of devices to be used in a substrate processing. The substrate processing component group is configured to perform a test operation performing a predetermined operation without using a substrate and an actual operation performing the substrate processing using the substrate. When the actual operation is performed a plurality of times, the substrate processing component group has a first substrate processing component constituted of a plurality of devices to be used in a first time of the actual operation and a second substrate processing component constituted of a plurality of devices to be unused in the first time of the actual operation and used in a second and succeeding times of the actual operations. When the actual operation is performed a plurality of times, the operation method includes causing the first substrate processing component to perform the test operation and causing the actual operation of the first substrate processing component to be started after completion of the test operation of the first substrate processing component. With this aspect, when the actual operation of the substrate processing component group is performed a plurality of times, the first actual operation can be started in a short time.

DESCRIPTION OF EMBODIMENTS

Figure 1:
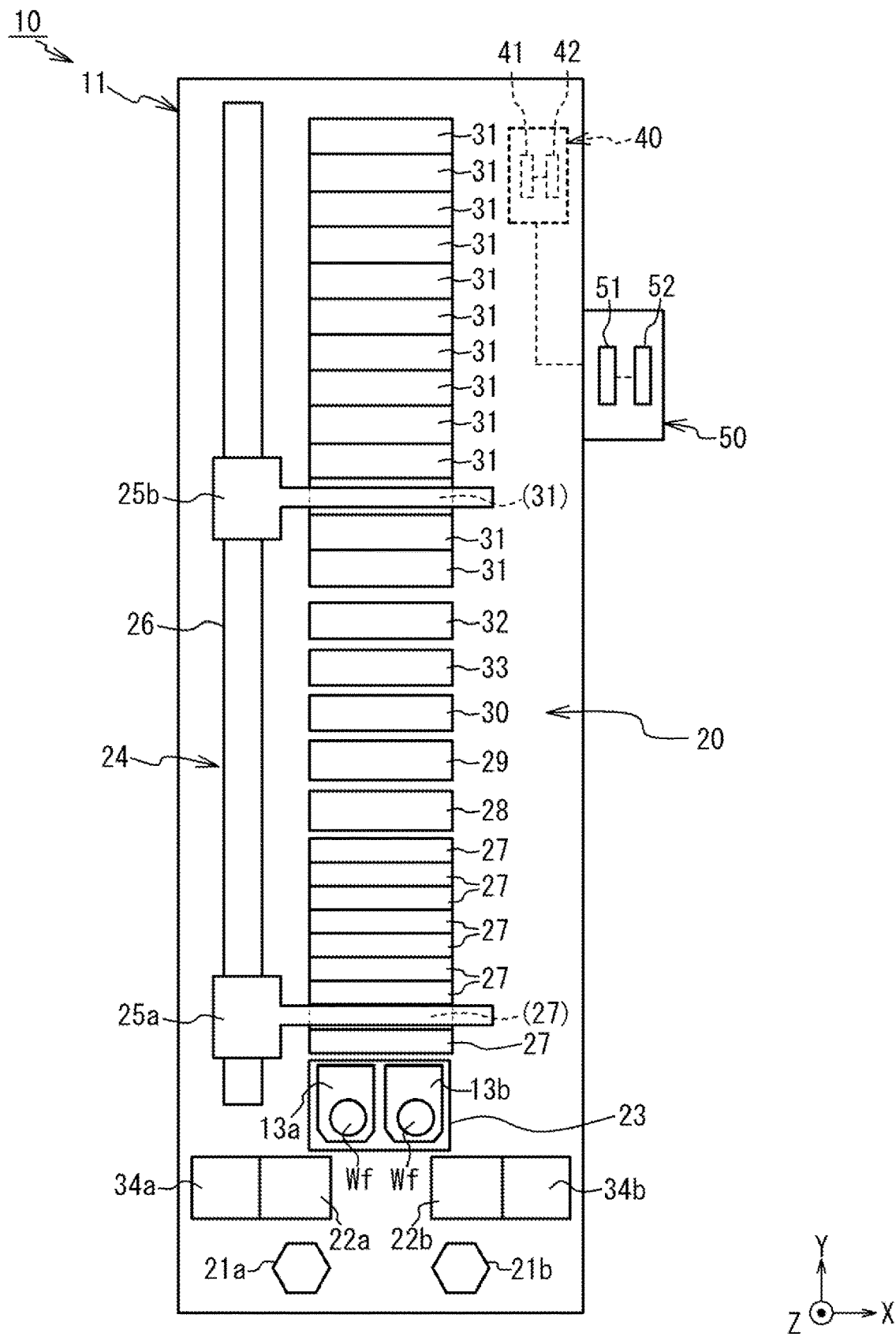
FIG. 1 is a configuration diagram schematically illustrating a main configuration of a substrate processing system according to an embodiment 1.

The following describes embodiments of the present invention with reference to the drawings. In the following respective embodiments, an identical reference numeral is attached to an identical or corresponding constitution and a description will be appropriately omitted in some cases. Furthermore, In the following respective embodiments, the drawings are schematically illustrated for ease of understanding features of the embodiments, and, for example, a dimensional proportion of each component is not always identical to that of an actual component. For some drawings, X-Y-Z orthogonal coordinates are illustrated for reference purposes. Of the X-Y-Z orthogonal coordinates, the Z direction corresponds to the upper side, and the −Z direction corresponds to the lower side (the direction where gravity acts).

Embodiment 1

FIG. 1 is a configuration diagram schematically illustrating a main configuration of a substrate processing system 10 according to the embodiment 1 of the present invention. The substrate processing system 10 according to the embodiment includes a substrate processing apparatus 11. The substrate processing apparatus 11 is an apparatus capable of performing a predetermined processing (referred to as a substrate processing) on a substrate Wf. In the embodiment, as one example of the substrate processing, a plating processing (specifically, an electroplating processing) is used. That is, the substrate processing apparatus 11 according to the embodiment is a plating apparatus.

The substrate processing apparatus 11 according to the embodiment includes a substrate processing component group 20, a controller 40, and an operation computer 50.

The substrate processing component group 20 is constituted of a plurality of devices used in the substrate processing. Specifically, as one example of the plurality of devices, the substrate processing component group 20 includes transfer robots (a transfer robot 21a and a transfer robot 21b), aligners (an aligner 22a and an aligner 22b), a fastening stage 23, a transporter 24, a stocker 27, a pre-wet module 28, a pre-soak module 29, a pre-soak rinse tank 30, a plating device 31, a rinse module 32, a delivery tank 33, and spin rinse dryers (a spin rinse dryer 34a and a spin rinse dryer 34b).

Here, an actual operation of the substrate processing according to the embodiment is performed a plurality of times (details of the actual operation will be described later). In the embodiment, of the plurality of times of the actual operations, at least in the first time of the actual operation, the two substrates Wf are set as one set, and the first time of the actual operation is performed using the one set of substrates Wf. As the specific example, in the embodiment, in every time of the actual operation of the plurality of times of the actual operation, the actual operation is performed with the two substrates Wf as one set.

However, the plurality of times of the actual operations are not limited to the above-described constitution. When taking another example, for example, each time of the actual operation can be performed using only one substrate Wf.

The transfer robot 21a is a device for transferring the substrate Wf between the aligner 22a, the fastening stage 23, and the spin rinse dryer 34a. The transfer robot 21b is a device for transferring the substrate Wf between the aligner 22b, the fastening stage 23, and the spin rinse dryer 34b.

The aligner 22a and the aligner 22b are devices for aligning the positions of, for example, an orientation flat and a notch of the substrate Wf in a predetermined direction (namely, devices performing the positioning of the substrate Wf).

The fastening stage 23 is a device for causing a substrate holder 13a and a substrate holder 13b to hold the one set of substrates Wf (two substrates Wf) transferred to the fastening stage 23. Specifically, the substrate holder 13a and the substrate holder 13b according to the embodiment each include a first holding member and a second holding member and each sandwich one substrate Wf between the first holding member and the second holding member to hold the (one) substrate Wf. The fastening stage 23 according to the embodiment is a device mainly performing the operation of causing the first holding member and the second holding member to sandwich the substrates Wf.

The transporter 24 is a device for transferring the substrates Wf (specifically, the substrate holders 13a and 13b that each hold the substrate Wf). The transporter 24 according to the embodiment includes a first transfer device 25a, a second transfer device 25b, and a transfer shaft 26. The first transfer device 25a and the second transfer device 25b can move along the transfer shaft 26 extending in the direction of the Y-axis (the Y direction and the −Y direction) and also can move in the direction of the Z-axis (the Z direction and the −Z direction). That is, in FIG. 1, the direction of the Y-axis corresponds to a "transfer shaft direction (the direction along the transfer shaft 26)" of the transporter 24.

In the embodiment, the first transfer device 25a basically transfers the substrates Wf in a range from the fastening stage 23 to the delivery tank 33 in the transfer shaft direction. The second transfer device 25b basically transfers the substrates Wf in a range from the pre-soak rinse tank 30 to the plating device 31 in the transfer shaft direction. However, the transfer ranges of the first transfer device 25a and the second transfer device 25b are not limited to this, and it is only necessary to be appropriately set corresponding to a kind of component device of the substrate processing apparatus 11.

The stocker 27 is a device for housing the substrate holders 13a and 13b. A plurality of stockers 27 according to the embodiment are arranged in the transfer shaft direction. Each stocker 27 houses a set of substrate holders (the substrate holder 13a and the substrate holder 13b), respectively.

The pre-wet module 28 is a device for cleaning the substrates Wf with a cleaning liquid (in the embodiment, pure water is used for one example). Specifically, the pre-wet module 28 according to the embodiment can selectively perform dipping the substrates Wf in the cleaning liquid and blowing the cleaning liquid onto the substrates Wf (blowing a shower of the cleaning liquid onto the substrates Wf).

The pre-soak module 29 is a device for removing an oxidized film of an electrically conductive layer formed on the surface of the substrates Wf with etching. The pre-soak module 29 stores an etchant. In the pre-soak module 29, for example, a heater for adjusting the temperature of the etchant and a pump for circulating the etchant are arranged.

The pre-soak rinse tank 30 is a device for cleaning the etchant attached on the substrates Wf with the cleaning liquid (in the embodiment, the pure water is used for one example). The pre-soak rinse tank 30 stores the pure water.

The plating device 31 is a device for performing the plating processing (namely, the substrate processing) on the surface of the substrates Wf. In the embodiment, a plurality of plating devices 31 are arranged in the transfer shaft direction. One set of substrate holders (namely, the substrate holder 13a and the substrate holder 13b) is transferred to the respective plating devices 31. Since the constitution of each plating device 31 is similar to that of a known plating device disclosed in above-described PLT 2, detail description will be omitted, and the outline of the constitution is as follows.

The plating device 31 stores a plating solution. Inside the plating solution, an anode held onto an anode holder is arranged. The substrates Wf held onto the substrate holders 13a and 13b is arranged inside the plating solution so as to oppose the anode. In the plating device 31, a heater is arranged, and the plating solution is adjusted within a predetermined temperature range with the heater. In the plating device 31, a pump is arranged, and the plating solution is circulated with the pump. In the plating device 31, a paddle is arranged, and the paddle is driven by a paddle driving device to stir the plating solution. Applying a plating voltage between the anode and the substrates Wf results in plating (for example, copper plating) performed on the surface of the substrates Wf That is, a plated layer is formed on the surface of the substrates Wf.

Similarly to PTL 2, a variable-opening-type anode mask is attached to the anode holder according to the embodiment. An opening portion of the anode mask (an anode opening portion) is positioned between the anode and the substrates Wf and has a constitution where its opening area (a size of the opening portion) can be changed with an opening method like an aperture mechanism of a camera. The smaller the opening area of the anode opening portion is made, the larger a thickness of the plating layer in a center portion of the substrates Wf can be made.

The rinse module 32 is a device for cleaning the plating solution attached on the substrates Wf with the cleaning liquid (in the embodiment, the pure water is used for one example). The rinse module 32 stores the cleaning liquid.

The delivery tank 33 is a device used when the substrates Wf are delivered between the first transfer device 25a and the second transfer device 25b. The delivery tank 33 according to the embodiment is a kind of container and is immobilized (namely, it is an immobilized device) during a test operation and an actual operation described later.

However, the constitution of the delivery tank 33 is not limited to this and may have a constitution performing some operation. When taking one example of this, the delivery tank 33 may perform an operation of, for example, blowing off water droplets attached on the substrates Wf by performing air blow (by blowing air) onto the substrates Wf.

The spin rinse dryer 34a and the spin rinse dryer 34b are devices for performing cleaning and drying of the substrates Wf. Specifically, while rotating the substrates Wf by a motor, the spin rinse dryer 34a and the spin rinse dryer 34b blow the pure water to the substrates Wf to clean the substrates Wf. Then, while rotating the substrates Wf at high speed, the spin rinse dryer 34a and the spin rinse dryer 34b remove the water content attached on the substrates Wf using centrifugal force.

The controller 40 is a device for controlling the substrate processing component group 20. The controller 40 according to the embodiment is arranged inside a housing of the substrate processing apparatus 11, as one example. Of the respective devices constituting the substrate processing component group 20, the controller 40 is electrically connected to the devices that performs the operation. The controller 40 according to the embodiment includes a microcomputer. The microcomputer includes, for example, a Central Processing Unit (CPU) 41 as a processor and a storage device 42 storing a program. The storage device 42 includes a non-transitory storage medium such as a Read Only Memory (ROM). The controller 40 controls the operation of each device of the substrate processing component group 20 by the CPU 41 as a processor operating based on the program stored in the storage device 42.

In FIG. 1, while the substrate processing apparatus 11 is illustrated to include one controller 40, it is not limited to this constitution. The substrate processing apparatus 11 may include a plurality of controllers 40, and each device of the substrate processing component group 20 may be distributedly controlled by the plurality of controllers 40.

The operation computer 50 is a computer for a user of the substrate processing system 10 to operate. Specifically, the operation computer 50 includes, for example, a keyboard operated by a user, a display displaying various kinds of pieces of information, a CPU 51 as a processor, and a storage device 52 storing a program. The storage device 52 includes a non-transitory storage medium (for example, a ROM). The operation computer 50 is electrically connected to the controller 40 to exchange the information with one another. Specifically, the operation computer 50 transmits operation contents from a user to the controller 40. With this, operating the operation computer 50 allows the user to provide an instruction for the controller 40. The controller 40 can also notify the user of predetermined information by causing the display of the operation computer 50 to display the predetermined information.

Subsequently, a description will be given of an outline of the operation of the substrate processing component group 20. First, the substrate processing component group 20 is constituted to perform the "test operation" performing the predetermined operation without using the substrates Wf and the "actual operation" performing the substrate processing using the substrates Wf, by receiving the instruction from the controller 40.

The outline of the operation of the substrate processing component group 20 "during the actual operation" is as follows. First the transfer robot 21a transfers the substrate Wf to the aligner 22a, and the transfer robot 21b transfers the substrate Wf to the aligner 22b. The aligner 22a and the aligner 22b each align the positions (the positions of, for example, the orientation flat and the notch) of the substrates Wf to a predetermined direction. Next, the first transfer device 25a holds the one set of substrate holders (the substrate holder 3a and the substrate holder 13b) housed in the stocker 27 to set it in the fastening stage 23.

Subsequently, the transfer robot 21a transfers the substrate Wf after being positioned at the aligner 22a to the fastening stage 23 to set the substrate Wf to the substrate holder 13a set in the fastening stage 23. Similarly, the transfer robot 21b transfers the substrate Wf after being positioned at the aligner 22b to the fastening stage 23 to set the substrate Wf to the substrate holder 13b set in the fastening stage 23. The fastening stage 23 causes the substrate holder 3a and the substrate holder 13b to hold these substrates Wf, respectively.

Next, the first transfer device 25a grasps the substrate holder 13a holding the substrate Wf and the substrate holder 13b holding the substrate Wf (namely, grasps one set of substrate holders holding one set of substrates Wf) and transfers to the pre-wet module 28. In the pre-wet module 28, the substrates Wf are cleaned with the cleaning liquid (pure water). Specifically, in the embodiment, based on a selection of the user, dipping the substrates Wf in the cleaning liquid or blowing the cleaning liquid onto the substrates Wf is selectively performed.

Subsequently, the first transfer device 25a transfers the substrate holder 13a and the substrate holder 13b after having been processed with the pre-wet module 28 to the pre-soak module 29. In the pre-soak module 29, the oxidized film on the conductive layer of the substrates Wf is removed by etching.

Next, the first transfer device 25a transfers the substrate holder 13a and the substrate holder 13b after having been processed with the pre-soak module 29 to the pre-soak rinse tank 30. In the pre-soak rinse tank 30, the etchant attached on the substrates Wf is cleaned with the cleaning liquid (pure water).

When etching is not performed with the pre-soak module 29 during the actual operation, the first transfer device 25a transfers the substrate holder 13a and the substrate holder 13b after having been processed with the pre-wet module 28 to the pre-soak rinse tank 30, not to the pre-soak module 29.

Subsequently, the second transfer device 25b holds the substrate holder 13a and the substrate holder 13b housed in the pre-soak rinse tank 30 to transfer to the plating device 31. In the plating device 31, the substrates Wf are dipped in the plating solution, and the plating layer is formed on the surfaces of the substrates Wf.

Next, the second transfer device 25b holds the substrate holder 13a and the substrate holder 13b after having been processed with the plating device 31 to transfer to the rinse module 32. In the rinse module 32, the substrates Wf are cleaned with the cleaning liquid (pure water).

Subsequently, the second transfer device 25b holds the substrate holder 13a and the substrate holder 13b after having been processed with the rinse module 32 to transfer to the delivery tank 33.

Next, the first transfer device 25a holds the substrate holder 13a and the substrate holder 13b in the delivery tank 33 to transfer to the fastening stage 23. In the fastening stage 23, the hold of the substrates Wf with the substrate holder 13a and the substrate holder 13b is released. This allows removing the substrates Wf from the substrate holder 13a and the substrate holder 13b.

Subsequently, the transfer robot 21a removes the substrate Wf from the substrate holder 13a to transfer to the spin rinse dryer 34a. Similarly, the transfer robot 21b removes the substrate Wf from the substrate holder 13b to transfer to the spin rinse dryer 34b. In the spin rinse dryers 34a and 34b, the substrates Wf are cleaned and dried.

With a sequence of operations as described above, the actual operation per one time is performed. By repeatedly performing the sequence of operations as described above, the actual operation is performed a plurality of times.

Next, the outline of the operation of the substrate processing component group 20 "during the test operation" will be described. The substrate processing component group 20 according to the embodiment, during the test operation, performs at least a part of the operations performed during the actual operation of the substrate processing component group 20, without using the substrate Wf. While the specific contents of the operations performed during the test operation are not particularly limited, the substrate processing component group 20 according to the embodiment performs the following operations, as one example.

During the test operation, for example, the transfer robot 21a and the transfer robot 21b move within a predetermined range. For example, the aligner 22a and the aligner 22b are moved in a predetermined region used when the substrate Wf is positioned. For example, the fastening stage 23 is moved in a predetermined region used w % ben the substrate holders 13a and 13b are held. For example, the first transfer device 25a and the second transfer device 25b move by a predetermined distance in the transfer shaft direction and the Z-axis direction (the upper and lower directions), respectively. For example, the stocker 27 is moved in a predetermined region used when the substrate holders 13a and 13b are delivered.

During the test operation, for example, the pre-wet module 28 causes the cleaning liquid to be discharged after causing the cleaning liquid to be stored in the pre-wet module 28. Specifically, the pre-wet module 28 according to the embodiment causes the pump to operate to cause the cleaning liquid to be stored in the pre-wet module 28 up to a predetermined level (a level H). At this time, a period required for the cleaning liquid to reach the predetermined level, a discharge pressure of the pump, and a discharge flow rate of the pump or the like can be detected, and based on the detection results, it can be confirmed whether a failure, such as clogging in a pipe (the pipe for supplying the cleaning liquid to the pre-wet module 28), communicated with the pump exists or not. Next, by halting the pump and causing the discharged valve for the cleaning liquid to be opened, the pre-wet module 28 causes the stored cleaning liquid to be discharged from the pre-wet module 28. At this time, based on a period required for the cleaning liquid to be discharged, it can be confirmed whether a failure, such as clogging in a pipe, where the cleaning liquid passes through when discharged exists or not.

The pre-wet module 28 according to the embodiment includes a mechanism (a shower up and down mechanism) that causes the shower for blowing the cleaning liquid to move up and down. Thus, during the test operation, the pre-wet module 28 controls the shower up and down mechanism to cause the shower to move up and down.

During the test operation, for example, the pre-soak module 29 causes the heater to operate and causes the pump to operate. During the test operation, for example, the pre-soak rinse tank 30 causes the cleaning liquid to be stored in the pre-soak rinse tank 30 and then causes the cleaning liquid to be discharged. Specifically, the pre-soak rinse tank 30 performs the operation similar to that of the above-described pre-wet module 28.

During the test operation, for example, the plating device 31 cause the heater to operate, causes the pump to operate, and causes the paddle to operate. As the embodiment, when the variable-opening type anode mask is arranged in the plating device 31, the opening area of the anode opening portion of the anode mask may be changed.

During the test operation, for example, the rinse module 32 causes the cleaning liquid to be discharged after causing the cleaning liquid to be stored in the rinse module 32. Specifically, the rinse module 32 performs the operation similar to that of the above-described pre-wet module 28. However, the rinse module 32 according to the embodiment does not include the shower up and down mechanism and thus, different from the pre-wet module 28, does not perform the operation causing the shower for blowing the cleaning liquid to move up and down, during the test operation.

During the test operation, for example, the spin rinse dryers 34a and 34b causes the motor used when the substrate Wf is cleaned and dried to rotate. As described above, the delivery tank 33 according to the embodiment does not operate during the actual operation, and thus does not operate even during the test operation. When, in the actual operation, the delivery tank 33 performs the above-described air blow, it is only necessary to cause an air blow device used in the air blow to be operated during the test operation. The outline of the operations of the substrate processing component group 20 during the test operation has been described above.

Here, when the actual operation of the substrate processing component group 20 is performed a plurality of times, the substrate processing component group 20 according to the embodiment includes a "first substrate processing component 100" and a "second substrate processing component 110." Here, the "first substrate processing component 100" is constituted of a plurality of devices used in the first time of the actual operation. Furthermore, the "second substrate processing component 110" is constituted of a plurality of devices unused in the first time of the actual operation and used in a second and succeeding times of the actual operations.

Figure 2:
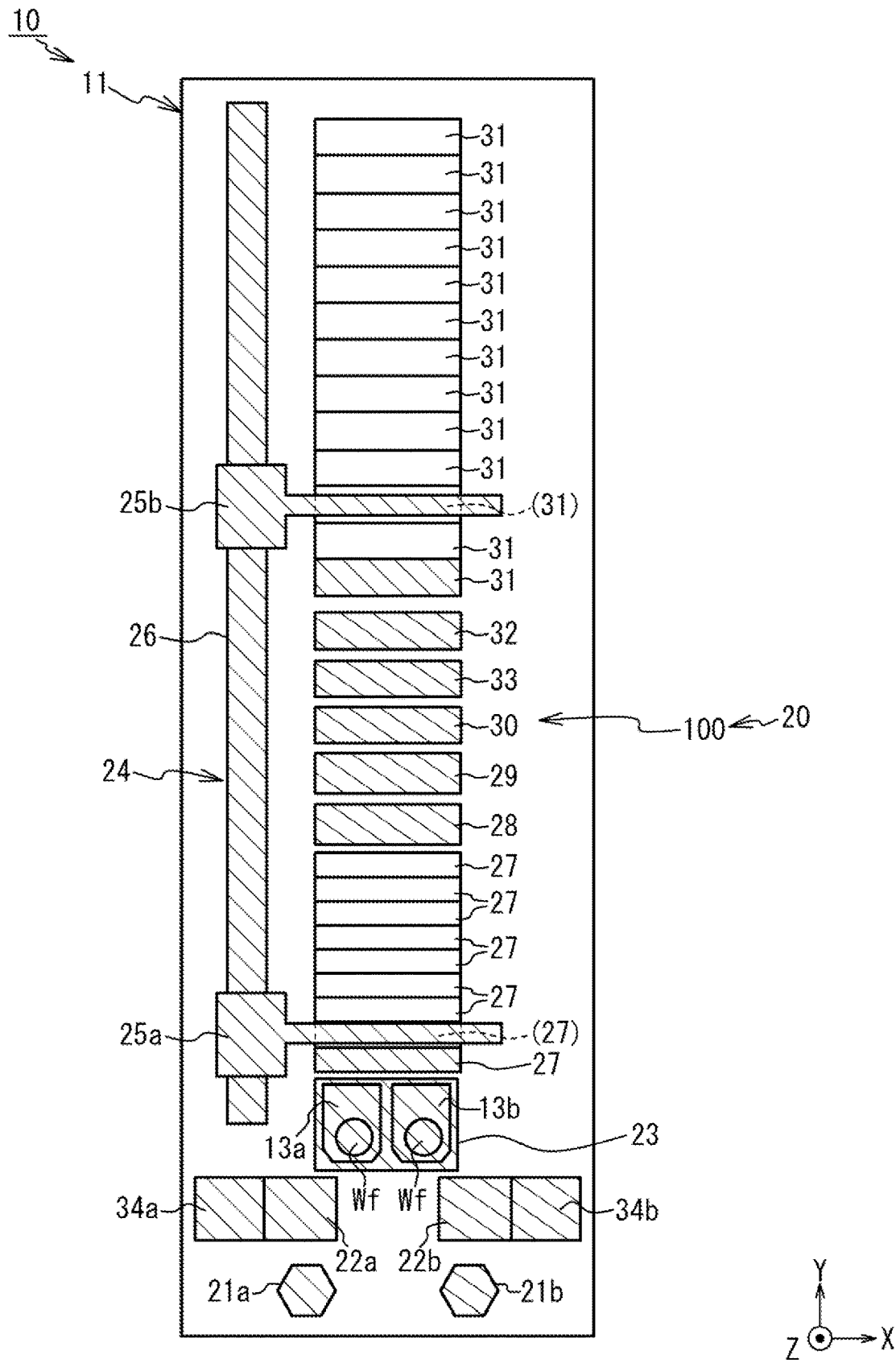
FIG. 2 is a schematic diagram for describing a first substrate processing component according to the embodiment 1.
Figure 3:
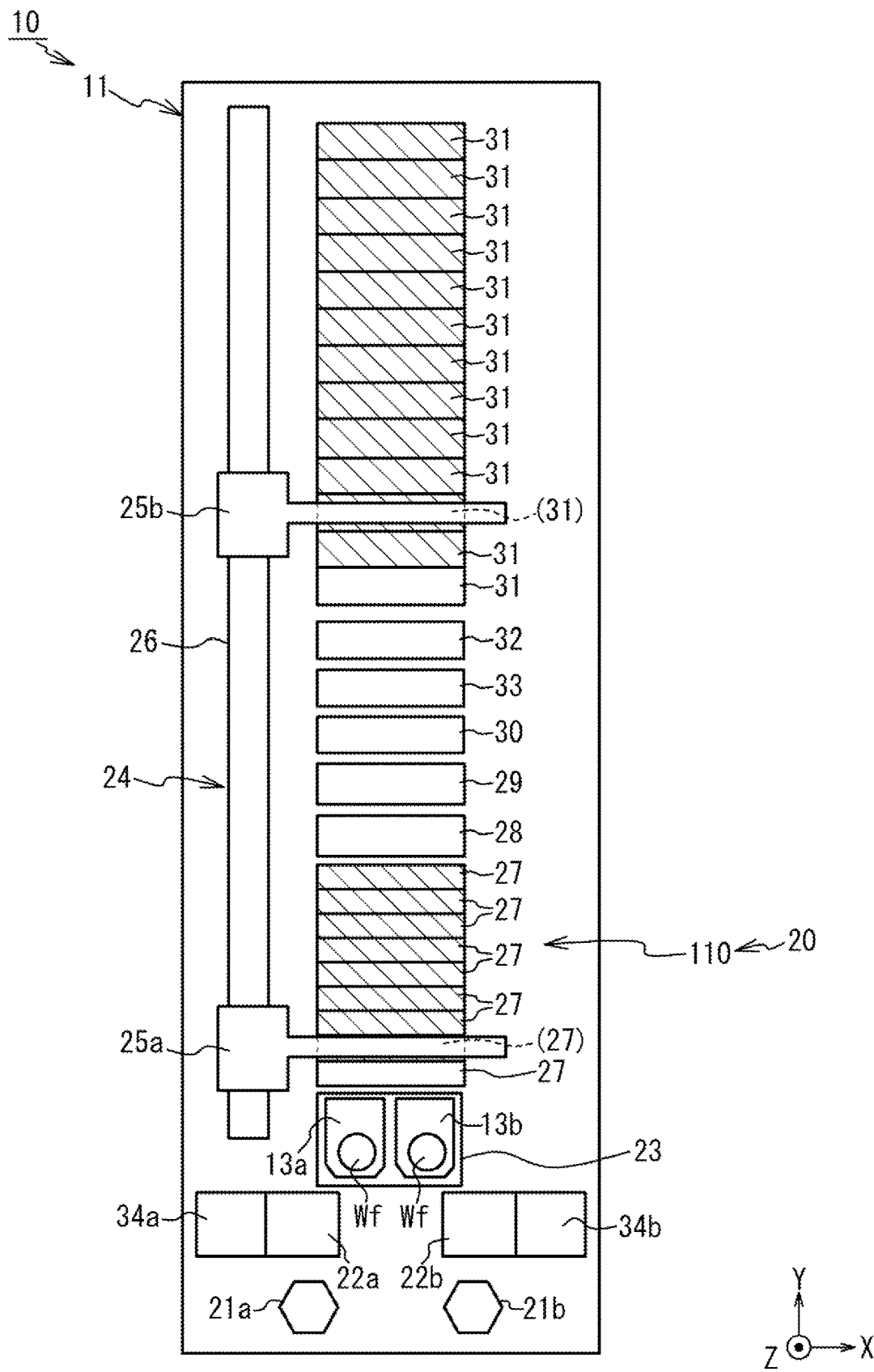
FIG. 3 is a schematic diagram for describing a second substrate processing component according to the embodiment 1.

FIG. 2 is a schematic diagram for describing the first substrate processing component 100. In FIG. 2, a hatching pattern is applied to the devices included in the first substrate processing component 100. FIG. 3 is a schematic diagram for describing the second substrate processing component 110. In FIG. 3, a hatching pattern is applied to the devices included in the second substrate processing component 110. In FIG. 2 and FIG. 3, illustrations of the controller 40 and the operation computer 50 are omitted.

As illustrated in FIG. 2, the first substrate processing component 100 according to the embodiment includes the transfer robot 21a, the transfer robot 21b, the aligner 22a, the aligner 22b, the fastening stage 23, the transporter 24, one stocker 27 arranged in the −Y direction side of the plurality of stockers 27, the pre-wet module 28, the pre-soak module 29, the pre-soak rinse tank 30, one plating device 31 arranged in the −Y direction side of the plurality of plating devices 31, the rinse module 32, the delivery tank 33, the spin rinse dryer 34a, and the spin rinse dryer 34b.

As illustrated in FIG. 3, the second substrate processing component 110 according to the embodiment includes the stockers 27 other than the stocker 27 included in the first substrate processing component 100 of the plurality of stocker 27 and the plating devices 31 other than the plating device 31 included in the first substrate processing component 100 of the plurality of plating devices 31.

When the actual operation is performed a plurality of times, in the first time of the actual operation, the controller 40 performs the substrate processing on the one set of substrates Wf using the devices included in the first substrate processing component 100 (in this case, the second substrate processing component 110 is not used). Subsequently, in the second and succeeding times of the actual operations, the controller 40 performs the substrate processing on the one set of substrates Wf using the predetermined devices selected from the devices included in the first substrate processing component 100 and the devices included in the second substrate processing component 110.

Figure 4:
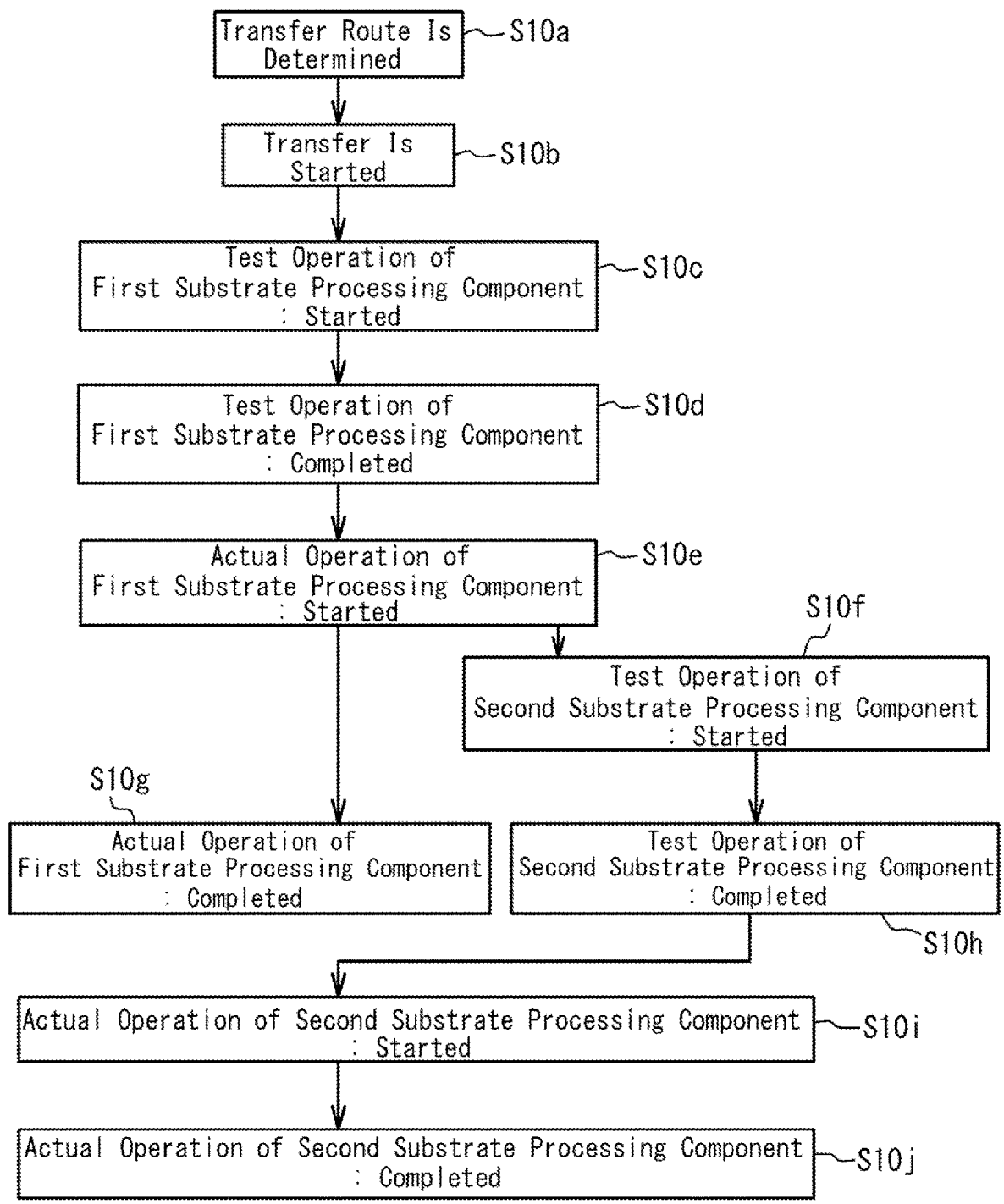
FIG. 4 is a flowchart illustrating one example of a test operation and actual operation control according to the embodiment 1.

Subsequently, a control processing of the controller 40 will be described. When performing the actual operation of the substrate processing component group 20 a plurality of times, the controller 40 executes a "test operation and actual operation control" described below. FIG. 4 is a flowchart illustrating one example of the test operation and actual operation control. The controller 40, specifically, the CPU 41 executes each step of the flowchart in FIG. 4 based on the program in the storage device 42. When receiving an "operation start command" indicating the fact to cause the plurality of times of the actual operations of the substrate processing component group 20 to be started, the controller 40 starts the execution of the test operation and actual operation control. Specifically, when receiving an "automatic-operation start command" indicating the fact to cause the plurality of times of the actual operations of the substrate processing component group 20 to be automatically started, the controller 40 according to the embodiment starts the execution of the test operation and actual operation control.

First, the controller 40 determines a transfer route of the substrates Wf in the substrate processing component group 20 (Step S10a). Specifically, at Step S10a, the controller 40 according to the embodiment selects the devices to be used in each time of the actual operation from the substrate processing component group 20 to determine the selection result. As a result of Step S10a, in the embodiment, it is assumed that the above-described first substrate processing component 100 (FIG. 2) and second substrate processing component 110 (FIG. 3) are selected.

Subsequently, the controller 40 causes the transfer of the substrates Wf to be started (Step S10b). Next, the controller 40 causes the test operation of the first substrate processing component 100 to be started (Step S10c). During the test operation, an order of the devices to start the test operation is not specifically limited. For example, the plurality of devices constituting the first substrate processing component 100 may simultaneously start the test operation or may start the test operation in a predetermined order.

Subsequently, the controller 40 causes the test operation of the first substrate processing component 100 to be completed (Step S10d). Next, the controller 40 causes the actual operation of the first substrate processing component 100 to be started (Step S10e).

Subsequently, during the execution of the actual operation of the first substrate processing component 100, the controller 40 causes the test operation of the second substrate processing component 110 to be started (Step S10f). Specifically, as one example, when the transfer (an actual transfer) by the transfer robot 21a is started after the start of the actual operation of the first substrate processing component 100, the controller 40 according to the embodiment causes the test operation of the second substrate processing component 110 to be started during the transfer by the transfer robot 21a.

During the test operation according to Step S10f, the order of the devices to start the test operation is not specifically limited. For example, the plurality of devices constituting the second substrate processing component 110 may simultaneously start the test operation or may start the test operation in a predetermined order.

Subsequently, the controller 40 causes the actual operation of the first substrate processing component 100 to be completed (Step S10g). The controller 40 causes the test operation of the second substrate processing component 110 to be completed (Step S10h). Next, after the completion of the test operation of the second substrate processing component 110, the controller 40 causes the actual operation of the second substrate processing component 110 to be started (Step S10i). Next, the controller 40 causes the actual operation of the second substrate processing component 110 to be completed (Step S10j).

As described above, when the actual operation of the substrate processing component group 20 is performed a plurality of times, the controller 40 according to the embodiment causes the test operation of the first substrate processing component 100 to be performed and then, after the completion of the test operation of the first substrate processing component 100, causes the actual operation of the first substrate processing component 100 to be started. Furthermore, during the execution of the actual operation of the first substrate processing component 100, the controller 40 causes the test operation of the second substrate processing component 110 to be started and then, after the completion of the test operation of the second substrate processing component 110, causes the actual operation of the second substrate processing component 110 to be started.

The operation method of the substrate processing system 10 according to the embodiment is achieved by the control by the controller 40 described above. Therefore, the detail description of the operation method will be omitted due to duplication with the above-described description.

According to the embodiment as described above, w % ben the actual operation of the substrate processing component group 20 is performed a plurality of times, the actual operation of first substrate processing component 100 is started after the completion of the test operation of the first substrate processing component 100 of the substrate processing component group 20. Thus, for example, compared with the case where the first actual operation of the substrate processing component group 20 is started after the completion of the test operation of all the devices of the substrate processing component group 20, the first actual operation can be started in a short time.

According to the embodiment, this allows reduced down time of the substrate processing apparatus 11, resulting in improvement of a substrate processing capacity per unit time (throughput) of the substrate processing apparatus 11.

Furthermore, according to the embodiment, during the execution of the actual operation of the first substrate processing component 100, the test operation of the second substrate processing component 110 is started. Thus, for example, compared with the case where the test operation of the second substrate processing component 110 is started after the completion of the actual operation of the first substrate processing component 100, the test operation of the second substrate processing component 110 can be promptly started. This allows/ensures reduced down time of the substrate processing apparatus 11, resulting in improvement of a substrate processing capacity per unit time of the substrate processing apparatus 11.

Furthermore, according to the embodiment, at least in the first time of the actual operation, the two substrates Wf are set as one set, and the actual operation is performed using the one set of substrates Wf. Thus, for example, compared with the case where the actual operation is performed using only one substrate Wf in the first time of the actual operation, the reduced down time of the substrate processing apparatus 11 can be achieved, resulting in improvement of a substrate processing capacity per unit time of the substrate processing apparatus 11.

Modification of Embodiment 1

In the embodiment 1 described above, while the controller 40 causes the test operation of the second substrate processing component 110 to be started during the execution of the actual operation of the first substrate processing component 100, it is not limited to this configuration. The controller 40 may cause the test operation of the second substrate processing component 110 to be started during the execution of the "test operation" of the first substrate processing component 100.

According to the modification, the following operational advantage can be provided in addition to the operational advantage of the above-described embodiment 1. That is, according to the modification, the test operation of the second substrate processing component 110 of the substrate processing component group 20 is started during the execution of the test operation of the first substrate processing component 100. Thus, for example, compared with the case where the test operation of the second substrate processing component 110 is started after the completion of the actual operation of the first substrate processing component 100 and the case where the test operation of the second substrate processing component 110 is started during the execution of the actual operation of the first substrate processing component 100, the test operation of the second substrate processing component 110 can be promptly started. This allows/ensures reduced down time of the substrate processing apparatus 11, resulting in improvement of a substrate processing capacity per unit time of the substrate processing apparatus 11.

Embodiment 2

Figure 5:
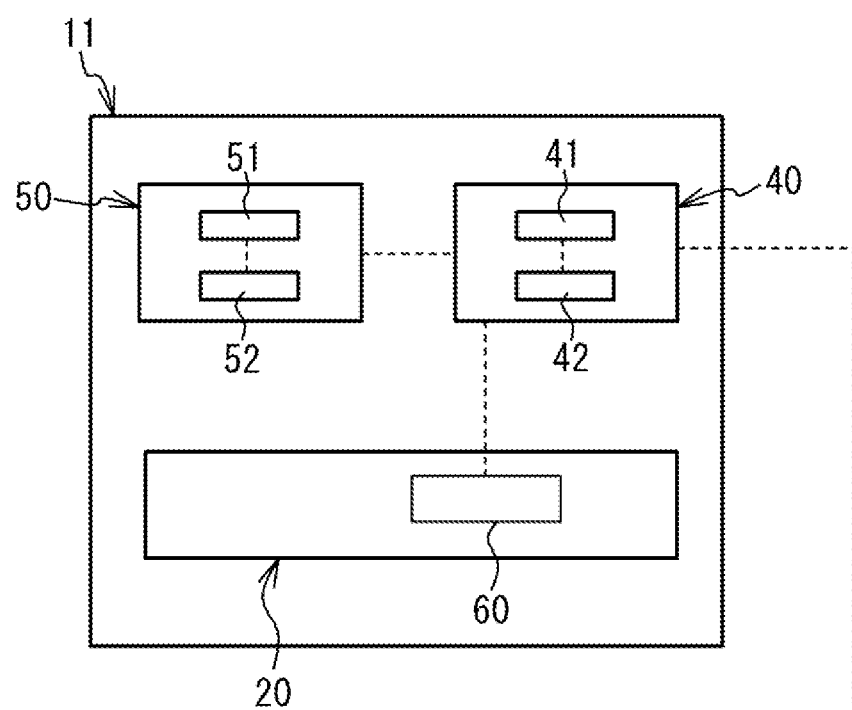
FIG. 5 is a function block diagram illustrating a configuration of a substrate processing system according to an embodiment 2.
Figure 5:
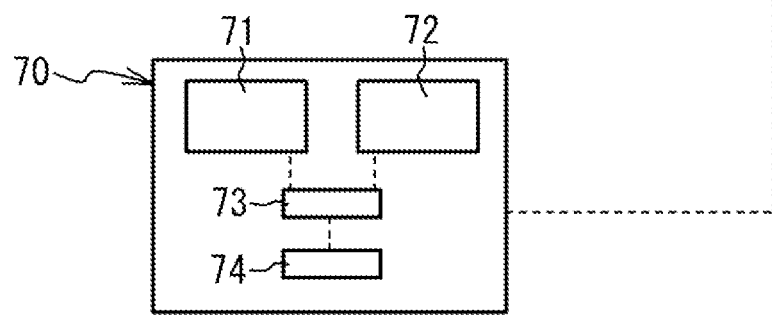

Subsequently, the embodiment 2 of the present invention will be described. FIG. 5 is a function block diagram illustrating a configuration of a substrate processing system 10A according to the embodiment. The substrate processing system 10A according to the embodiment is mainly different from the substrate processing system 10 according to the above-described embodiment 1 (including the modification) in that the substrate processing system 10A further includes a failure detection device 70.

The failure detection device 70 is a device that detects a failure of the substrate processing component group 20 based on an operating state of the substrate processing component group 20, during the execution of the test operation of the substrate processing component group 20. Specifically, the failure detection device 70 according to the embodiment detects the failure of the first substrate processing component 100 based on the operating state during the test operation of the first substrate processing component 100, during the execution of the test operation of the first substrate processing component 100, and the failure detection device 70 detects the failure of the second substrate processing component 110 based on the operating state during the test operation of the second substrate processing component 110, during the execution of the test operation of the second substrate processing component 110.

The failure detection device 70 according to the embodiment is, as one example, constituted of a terminal device (namely, the terminal device for failure detection) separate from the substrate processing apparatus 11. However, the failure detection device 70 is not limited to this constitution and may be integrated into the substrate processing apparatus 11. When taking a specific example of this, for example, the failure detection device 70 may be secured to a housing of the substrate processing apparatus 11. In this case, the substrate processing system 10A may include a constitution where the failure detection device 70 and the controller 40 are integrated with one another to be one controller. In this case, the one controller has the function as the controller 40 and the function as the failure detection device 70.

The failure detection device 70 according to the embodiment includes, for example, an operator 71 (such as an operation panel) operated by a user, a display 72 displaying various kinds of pieces of information, a CPU 73 as a processor, and a storage device 74 having a non-transitory storage medium (for example, a ROM). The display 72 according to the embodiment is one example of a member having a function as a "notification module" notifying information. The storage device 74 stores, for example, a program. The failure detection device 70 performs the failure detection by the CPU 73 as a processor operating based on the program stored in the storage device 74. During the use of the failure detection device 70, the failure detection device 70 is electrically connected to the controller 40 by wired or wireless connection. This allows the failure detection device 70 and the controller 40 to mutually exchange information.

In the embodiment, a sensor 60 detecting the operation state of each device is arranged in each device constituting the substrate processing component group 20. In FIG. 5, while only one sensor 60 is illustrated to simplify the illustration, the actual substrate processing apparatus 11 includes a plurality of sensors 60. Each sensor 60 transmits a value detected (a detected value) to the controller 40. The controller 40 transmits the detected values of the sensors 60 to the failure detection device 70.

The failure detection device 70 obtains physical quantities (physical quantities changing in accordance with the operation) that change during the operation of each device constituting the substrate processing component group 20, based on the detected values of the sensors 60. Next, the failure detection device 70 detects the failure of each device by comparing the obtained physical quantities with predetermined reference values. Appropriate values of the reference values are obtained by preliminary performing, for example, experiments and simulations and are stored in the storage device 74. The failure detection device 70 transmits a detected result to the controller 40.

The failure detection device 70 according to the embodiment calculates a "failure level" that is an index indicating a degree of failure of the substrate processing component group 20, based on the operation state of the substrate processing component group 20, and the failure detection device 70 determines whether the calculated failure level is a "low level" or not, or whether the calculated failure level is a "high level" where the degree of failure is higher than the low level or not.

Specifically, the failure detection device 70 uses a "first reference value" and a "second reference value" where the degree of failure is higher than the first reference value, as the above-described reference value (the reference value for determination in detecting the failure). The first reference value is an upper-limit value at normal time. When the physical quantity obtained based on the detected value of the sensor 60 is less than the first reference value, the failure detection device 70 determines that no failure exists. When the physical quantity obtained based on the detected value of the sensor 60 is equal to or more than the first reference value and less than the second reference value, the failure detection device 70 determines that the failure level is the low level. When the physical quantity obtained based on the detected value of the sensor 60 is equal to or more than the second reference value, the failure detection device 70 determines that the failure level is the high level.

It is only necessary that appropriate values of the first reference value and the second reference value are obtained by preliminarily performing, for example, experiments and simulations and are stored in the storage device 74. The failure detection device 70 notifies a user of the determination result. Specifically, the failure detection device 70 according to the embodiment, for example, causes the display 72 (notification module) to display the determination result. In addition, the failure detection device 70 also transmits the determination result to the controller 40.

In the embodiment, the case where the failure level is the high level corresponds to the case where it is considered better to stop using a device with such high level. Specifically, the case where the failure level is the high level corresponds to the case where it is considered that continuously using the device with such high level generates damage (for example, a wafer scrap) to the substrate Wf and degrades the quality of the substrate processing (in the embodiment, the quality of the plating processing), resulting in making the quality of the substrate falling out of the allowable range.

On the other hand, in the embodiment, the case where the failure level is the low level corresponds to the case where while using the device with the failure level of this level does not generate damage to the substrate Wf and does not degrade the quality of the substrate processing to make the quality of the substrate processing falling out of the allowable range, and thus stopping the use of the device is not required, it is considered that the user should be notified of the fact that a replacement timing of the device is approaching.

The specific example of the physical quantity used in the failure detection includes the following. For example, when there is a device having a cylinder in the substrate processing component group 20, the physical quantities, such as an operating time (sec) of the cylinder, and an operating sound volume (dB) of an electromagnetic valve of the cylinder, can be used. For example, when there is a device having a servo motor in the substrate processing component group 20, the physical quantities, such as a heat generation amount (J) of the servo motor, the operating sound volume (dB) of the servo motor, a vibration level (dB) of the servo motor, and a load factor (%) of the servo motor, can be used.

For example, when there is a device having a rectifier in the substrate processing component group 20, the physical quantities, such as a current value (A) of the rectifier, a voltage value (V) of the rectifier, and a resistance value (Ω) of the rectifier, can be used. For example, when there is a device having a pump in the substrate processing component group 20, the physical quantities, such as a discharge flow rate ($m^3$/sec) of the pump, a discharge pressure (Pa) of the pump, and a discharge period (sec) of the pump, can be used. For example, when there is a device having a valve, such as an on-off valve or a flow regulating valve, in the substrate processing component group 20, the physical quantities, such as a discharge flow rate ($m^3$/sec) of the valve, a discharge pressure (Pa) of the valve, and a discharge period (sec) of the valve, can be used.

For example, when there is a tank (container) storing liquid in the substrate processing component group 20, the physical quantities, such as a storage amount ($m^3$) of the liquid stored in the tank, a period (sec) required by the time the storage amount of the liquid reaches a predetermined amount, and a period (sec) required by the time the storage amount of the liquid becomes zero (namely, a period required to discharge the liquid), can be used. In addition, among the substrate processing component group 20, especially, for the transporter 24, the physical quantities, such as a load (%), a vibration level (dB), and an operating sound volume (dB) in the operation, can be used.

Taking the above-described pre-wet module 28 as an example, a specific example of determination of the above-described failure level will be described as follows. For example, as described above, during the test operation of the pre-wet module 28, the pump is operated to cause the cleaning liquid to be stored into the pre-wet module 28 up to a predetermined level (level H). In this case, the failure detection device 70 obtains the period required for the cleaning liquid to reach the predetermined level, the discharge pressure of the pump, and the discharge flow rate of the pump, based on the detection results of the sensor 60 detecting the physical quantity on the storage amount of the cleaning liquid in the pre-wet module 28 and the sensor 60 detecting the physical quantities on the pump. Then, by comparing these detected values with the first reference value and the second reference value, the failure detection device 70 determines whether the failure level is the low level or the high level to notify the determination result. This allows a user, for example, to grasp that the failure, such as clogging, is occurring in the pipe (the pipe for supplying the cleaning liquid to the pre-wet module 28) communicated with the pump and to grasp whether the failure level is the low level or the high level.

Furthermore, for example, as described above, during the test operation of the pre-wet module 28, the pump is stopped, and the discharge valve (namely, the on-off valve) for the cleaning liquid is opened to cause the cleaning liquid to be discharged from the pre-wet module 28. In this case, the failure detection device 70 obtains the period required for the cleaning liquid to be discharged, based on the detection result of the sensor 60 detecting the physical quantity on the storage amount of the cleaning liquid in the pre-wet module 28. Then, by comparing the detected value with the first reference value and the second reference value, the failure detection device 70 determines whether the failure level is the low level or the high level to notify the determination result. This allows a user, for example, to grasp that the failure, such as clogging, is occurring in the pipe for discharging the cleaning liquid from the pre-wet module 28 and to grasp whether the failure level is the low level or the high level.

Figure 6:
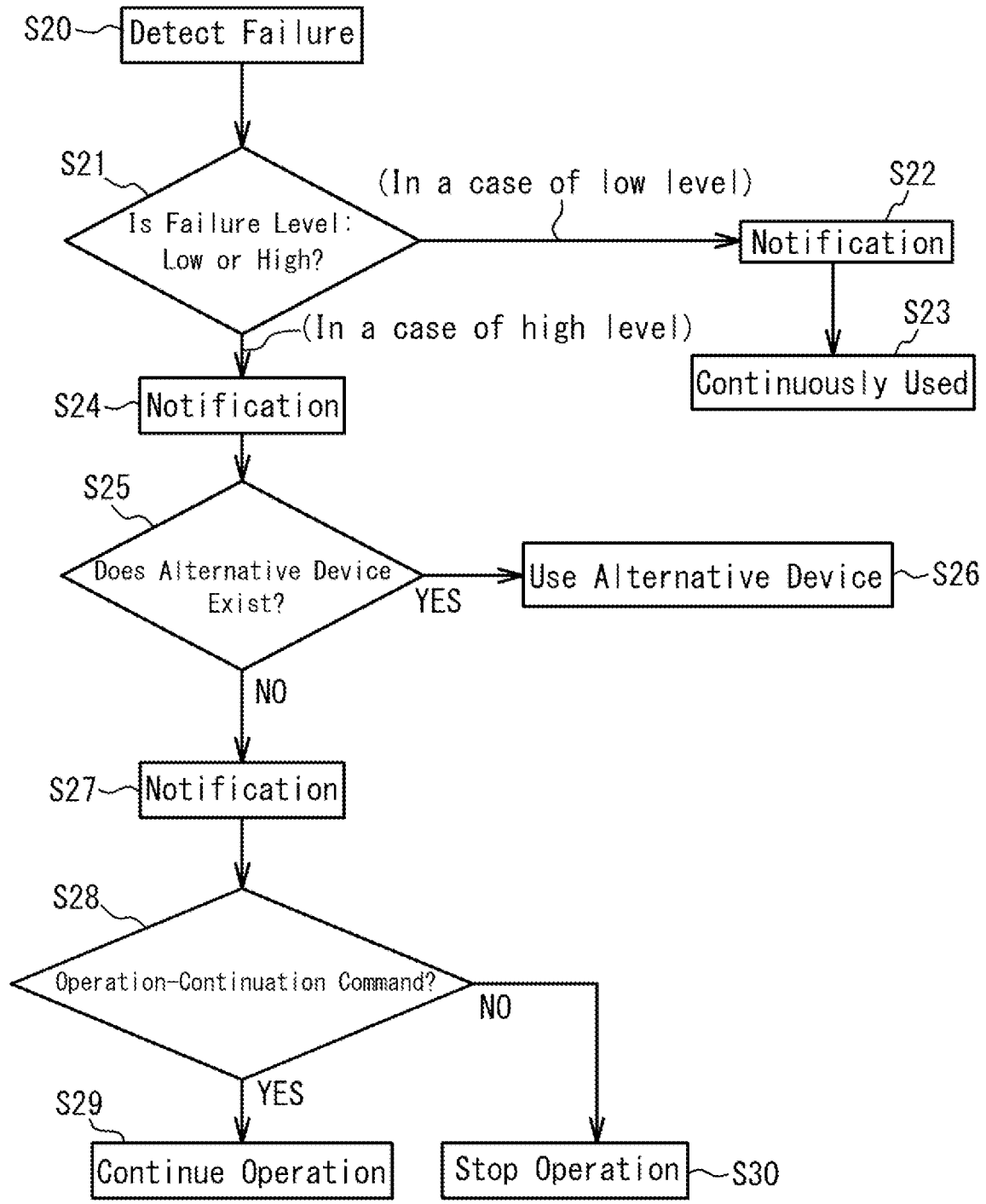
FIG. 6 is a flowchart illustrating one example of a sequence of a control processing performed when a failure is detected, in the embodiment 2.

Subsequently, a sequence of control processing performed when a failure is detected will be described. FIG. 6 is a flowchart illustrating one example of the sequence of control processing performed when a failure is detected. Each step of the flowchart in FIG. 6 is executed by the failure detection device 70, specifically, the CPU 73 based on the program stored in the storage device 74.

At Step S20, when a fact that there is a failure in the substrate processing component group 20 (that is, when the physical quantity obtained based on the detected value of the sensor 60 is equal to or more than the first reference value) is detected by the failure detection device 70, the failure detection device 70 determines whether the failure level of the substrate processing component group 20 is the low level or the high level (Step S21).

At Step S21, when it is determined that the failure level is the low level, the failure detection device 70 notifies the fact that the failure level is the low level (Step S22). The specific contents at Step S22 are not specifically limited, and, as one example, the failure detection device 70 according to the embodiment causes the display 72 of the failure detection device 70 to display the name of the device to be determined as the low level in the failure level and the fact that the failure level is the low level. Furthermore, in this case, the failure detection device 70 may notify the replacement timing (a timing to execute replacement) of the device to be determined as the low level in the failure level.

After Step S22, the failure detection device 70 determines causing the device where the failure has been detected to be continuously used (Step S23). That is, in this case, since the failure level of the device is the low level, it is considered that continuously using the device does not generate the damage to the substrate Wf and make the quality of the substrate processing falling out of the allowable range. Thus, the failure detection device 70 determines causing the device to be continuously used. The controller 40 having received the determination result actually causes the device to be continuously used.

On the other hand, at Step S21, when it is determined that the failure level is the high level, the failure detection device 70 notifies the fact that the failure level is the high level (Step S24). Specifically, the failure detection device 70 according to the embodiment causes the display 72 of the failure detection device 70 to display the name of the device to be determined as the high level in the failure level and the fact that the failure level is the high level.

After Step S24, the failure detection device 70 executes Step S25. At Step S25, the failure detection device 70 determines whether an "alternative device" that is another device capable of executing the processing identical to the processing executed by the device to be determined as the high level in the failure level exists or not.

Referring to FIG. 1, in the embodiment, for example, for the stocker 27 and the plating device 31, a plurality of devices capable of executing the identical processing (namely, the identical type of device) exist. Thus, when determining that, among these devices, the failure level of any of the devices is the high level, the failure detection device 70 determines that the alternative device capable of executing the identical processing exists (YES).

At Step S25 in FIG. 6, when it is determined that the alternative device exists (YES), the failure detection device 70 determines to use the alternative device instead of the device to be determined as the high level in the failure level (Step S26). The controller 40 having received the determination result actually uses the alternative device instead of the device to be determined as the high level in the failure level, during the test operation and the actual operation. That is, in this case, the test operation is continued by using the alternative device, and the subsequent actual operation is also performed.

A specific example of Step S25 and Step S26 described above is taken as follows. For example, at Step S25, when it is determined that, among the plurality of plating devices 31, the failure level of one plating device 31 (this is referred to as a specified plating device) is the high level, the failure detection device 70 determines at Step S26 to use one plating device 31 selected from the plating devices 31 other than the specified plating device as the alternative device. Then, the controller 40 having received the determination result uses the plating device 31 as the alternative device instead of the specified plating device, during the test operation and the actual operation.

At Step S25, when it is determined that no alternative device exists (NO), the failure detection device 70 notifies "that no alternative device exists and whether to cause the operation of the substrate processing component group 20 to be continued or not" (Step S27). The specific contents at Step S27 are not specifically limited, and, as one example, the failure detection device 70 according to the embodiment causes the display 72 of the failure detection device 70 to display the above-described fact.

A user who has received the notification at Step S27 can select whether to cause the test operation of the substrate processing component group 20 to be continued using the device to be determined as the high level in the failure level or not. Then, the user provides a command whether to cause the test operation to be continued or not, to the failure detection device 70. Specifically, the user transmits a command to cause the test operation to be continued (operation-continuation command) or a command to cause the test operation to be stopped (operation-stop command) to the CPU 73 of the failure detection device 70, by operating the operator 71 of the failure detection device 70.

Next, the failure detection device 70 determines whether the operation-continuation command exists (Step S28) or not. At Step S28, when it is determined that the operation-continuation command exists (YES), the failure detection device 70 determines to cause the test operation of the substrate processing component group 20 to be continued to transmit the determination result to the controller 40 (Step S29). The controller 40 having received the determination result causes the test operation of the substrate processing component group 20 to be continued in a state where the device to be determined as the high level in the failure level is used, and the subsequent actual operation is also performed.

On the other hand, at Step S28, when it is determined that no operation-continuation command exists (NO), that is, the operation-stop command exists, the failure detection device 70 determines to cause the test operation of the substrate processing component group 20 to be stopped to transmit the determination result to the controller 40 (Step S30). The controller 40 having received the determination result causes the test operation of the substrate processing component group 20 to be stopped. As a result, the actual operation of the substrate processing component group 20 is also stopped.

According to the embodiment as described above, in addition to the operational advantage of the above-described embodiment 1 (including the modification), the following operational advantage can be provided. That is, according to the embodiment, since the substrate processing system 10A includes the failure detection device 70, the failure of the substrate processing component group 20 can be detected during the execution of the test operation of the substrate processing component group 20 (Step S20).

Furthermore, according to the embodiment, since the failure detection device 70 determines whether the failure level of the substrate processing component group 20 is the low level or the high level to notify the determination result (Step S22, Step S24), the user received the notification can easily grasp whether the failure level is the low level or the high level. This allows the user to promptly take appropriate countermeasures corresponding to the failure level. In addition, this ensures reducing the occurrence of the damage to the substrate Wf and the degradation of the quality of the substrate process resulting in falling out of the allowable range caused by, for example, the substrate processing having been performed using the device with such high level in the failure level, despite being the high level in the failure level.

Furthermore, according to the embodiment, in the case where the failure level is the high level, when an alternative device exists in the plurality of devices constituting the substrate processing component group 20, the test operation and the actual operation of the substrate processing component group 20 can be performed using the alternative device (Step S26). This ensures causing the test operation and the actual operation of the substrate processing component group 20 to be continued using the alternative device and ensures reducing the occurrence of the damage to the substrate Wf and the degradation of the quality of the substrate process resulting in falling out of the allowable range caused by the actual operation using the device with the high level in the failure level.

As described above, while the details of, for example, the embodiments of the present invention have been described, the present invention is not limited to, for example, the specific embodiments, and various kinds of modifications and changes can be made within the scope of the present invention described in the claims.

For example, the constitution of the substrate processing component group 20 is not limited to the constitution illustrated in, for example, FIG. 1, and it is only necessary that the constitution is appropriately set corresponding to the content of the substrate processing performed by the substrate processing apparatus 11. The specific example of the substrate processing is not limited to the plating processing and is applicable to a known substrate processing other than the plating processing.

REFERENCE SIGNS LIST 10,10A . . . substrate processing system
11 . . . substrate processing apparatus
20 . . . substrate processing component group
21a. 21b . . . transfer robot
22a, 22b . . . aligner
23 . . . fastening stage
24 . . . transporter
27 . . . stocker
28 . . . pre-wet module
29 . . . pre-soak module
30 . . . pre-soak rinse tank
31 . . . plating device
32 . . . rinse module
33 . . . delivery tank
34a, 34b . . . spin rinse dryer
40 . . . controller
50 . . . operation computer
60 . . . sensor
70 . . . failure detection device
100 . . . first substrate processing component
110 . . . second substrate processing component
Wf . . . substrate

What is claimed is:

1. A substrate processing system comprising
a substrate processing apparatus, wherein
the substrate processing apparatus includes:
  a substrate processing component group constituted of a plurality of devices to be used in a substrate processing; and
  a controller configured to control the substrate processing component group,
the substrate processing component group is configured to perform a test operation performing a predetermined operation without using a substrate and an actual operation performing the substrate processing using the substrate,
when the actual operation is performed a plurality of times, the substrate processing component group includes:
  a first substrate processing component constituted of a plurality of devices to be used in a first time of the actual operation; and
  a second substrate processing component constituted of a plurality of devices to be unused in the first time of the actual operation and used in a second and succeeding times of the actual operations, and
when the actual operation is performed a plurality of times, the controller causes the first substrate processing component to perform the test operation and causes the actual operation of the first substrate processing component to be started after completion of the test operation of the first substrate processing component.

2. The substrate processing system according to claim 1, wherein
during execution of the actual operation of the first substrate processing component or during execution of the test operation of the first substrate processing component, the controller causes the test operation of the second substrate processing component to be started and causes the actual operation of the second substrate processing component to be started after completion of the test operation of the second substrate processing component.

3. The substrate processing system according to claim 1, wherein
at least in the first time of the actual operation, the two substrates are set as one set, and the actual operation is performed using the one set of substrates.

4. The substrate processing system according to claim 1, further comprising
a failure detection device configured to detect a failure of the substrate processing component group based on an operating state of the substrate processing component group, during execution of the test operation of the substrate processing component group.

5. The substrate processing system according to claim 4, wherein
when having detected a failure of the substrate processing component group, the failure detection device determines whether a failure level as an index indicating a degree of a failure of the substrate processing component group is a low level or a high level where a degree of a failure is higher than the low level and notifies the determination result.

6. The substrate processing system according to claim 5, wherein
in a case where the failure level is the high level, when an alternative device configured to perform a processing identical to a processing performed by a device to be determined as the high level in the failure level exists in a plurality of devices constituting the substrate processing component group, the controller uses the alternative device instead of a device to be determined as the high level in the failure level in the test operation and the actual operation.

7. A controller for a substrate processing system including a substrate processing component group constituted of a plurality of devices to be used in a substrate processing, wherein
the substrate processing component group is configured to perform a test operation performing a predetermined operation without using a substrate and an actual operation performing the substrate processing using the substrate,
when the actual operation is performed a plurality of times, the substrate processing component group has a first substrate processing component constituted of a plurality of devices to be used in a first time of the actual operation and a second substrate processing component constituted of a plurality of devices to be unused in the first time of the actual operation and used in a second and succeeding times of the actual operations, and
when the actual operation is performed a plurality of times, the controller causes the first substrate processing component to perform the test operation and causes the actual operation of the first substrate processing component to be started after completion of the test operation of the first substrate processing component.

8. An operation method of a substrate processing system including a substrate processing component group constituted of a plurality of devices to be used in a substrate processing, wherein
the substrate processing component group is configured to perform a test operation performing a predetermined operation without using a substrate and an actual operation performing the substrate processing using the substrate,
when the actual operation is performed a plurality of times, the substrate processing component group has a first substrate processing component constituted of a plurality of devices to be used in a first time of the actual operation and a second substrate processing component constituted of a plurality of devices to be unused in the first time of the actual operation and used in a second and succeeding times of the actual operations, and
when the actual operation is performed a plurality of times, the operation method comprises causing the first substrate processing component to perform the test operation and causing the actual operation of the first substrate processing component to be started after completion of the test operation of the first substrate processing component.

* * * * *